United States Patent
Barefoot (10) Patent No.: US 10,549,814 B2
(45) Date of Patent: Feb. 4, 2020

(54) HIGH EFFICIENCY DAMPER FOR BICYCLE SUSPENSION

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

(*) Notice: Subject to any disclaimer, the term of this patent is extended or adjusted under 35 U.S.C. 154(b) by 0 days.

(21) Appl. No.: 15/869,309

(22) Filed: Jan. 12, 2018

(65) Prior Publication Data

US 2018/0135721 A1 May 17, 2018

Related U.S. Application Data

(63) Continuation of application No. 15/084,757, filed on Mar. 30, 2016, now Pat. No. 9,903,436.

(60) Provisional application No. 62/139,874, filed on Mar. 30, 2015.

(51) Int. Cl.
| | |
|---|---|
| *B62K 25/08* | (2006.01) |
| *F16F 9/34* | (2006.01) |
| *F16F 9/46* | (2006.01) |
| *F16F 9/44* | (2006.01) |

(52) U.S. Cl.
CPC .............. *B62K 25/08* (2013.01); *F16F 9/44* (2013.01); *F16F 9/46* (2013.01); *F16F 9/467* (2013.01); *F16F 2228/08* (2013.01)

(58) Field of Classification Search
CPC ...... F16F 9/34; F16F 9/44; F16F 9/461; F16F 9/462; F16F 9/466; F16F 9/467; F16F 2228/08
See application file for complete search history.

(56) References Cited

U.S. PATENT DOCUMENTS

| | | |
|---|---|---|
| 2,089,418 A | 8/1937 | Peo et al. |
| 3,321,051 A | 5/1967 | Heckelthorn |
| 3,470,986 A | 10/1969 | Whisler, Jr. |
| 4,685,545 A | 8/1987 | Fannin et al. |
| 5,139,119 A | 8/1992 | Karnopp |
| 5,150,916 A | 9/1992 | Petrofes et al. |
| 5,153,703 A | 10/1992 | Suga et al. |
| 5,542,509 A | 8/1996 | Bell |
| 6,217,049 B1 | 4/2001 | Becker |
| 6,382,370 B1 | 5/2002 | Girvin |
| 6,592,136 B2 | 7/2003 | Becker et al. |
| 6,651,788 B1 | 11/2003 | Wohlfarth |
| 6,802,407 B1 | 10/2004 | Chen |
| 7,004,186 B2 | 2/2006 | Ferrel |
| 7,163,223 B2 | 1/2007 | Wesling et al. |
| 2015/0284048 A1 | 10/2015 | Barefoot |

*Primary Examiner* — Thomas J Williams
(74) *Attorney, Agent, or Firm* — Jason H. Foster; Kremblas & Foster (57) ABSTRACT

A shock absorber has a valve controlling the flow rate of fluid between a first chamber and a second chamber. The shock absorber may include a blocker that has a variable profile. The blocker may be rotatable using an external adjuster to position the blocker to variably occlude an aperture and vary the damping of the suspension. A bias may also be positioned adjacent the blocker to allow force from the fluid to move the blocker and expose the aperture, thereby allowing fluid to flow through the entirety of the aperture.

42 Claims, 6 Drawing Sheets

HIGH EFFICIENCY DAMPER FOR BICYCLE SUSPENSION

CROSS-REFERENCES TO RELATED APPLICATIONS

The present application is a continuation of U.S. patent application Ser. No. 15/084,757, filed on Mar. 30, 2016 and now U.S. Pat. No. X, which claims priority to U.S. Provisional Application No. 62/139,874, filed on Mar. 30, 2015, the disclosures of which are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The invention relates generally to suspension components on vehicles, and more particularly to a shock absorber with a damper valve that incorporates a blocker with a variable profile and a bias to provide adjustable damping of suspension compression.

2. Description of the Related Art

Conventional shock absorbers employ a piston in a cylinder containing a substantially incompressible fluid. Orifices in the piston and passages leading to a fluid reservoir regulate the flow of the fluid so as to damp the oscillation of a suspension spring. In more advanced designs, a damper valve may also be incorporated at an end of a suspension or shock absorber. Valves of this design open progressively with greater force and can be used to damp low-speed compression and/or extension of shock absorbers while preventing pressure "spikes" and consequent harshness of ride when the suspension must compress deeply and quickly. They can also permit the shock to extend rapidly after deep compression while slowing it sufficiently near maximum extension to prevent harsh "topping out".

Figure 1:
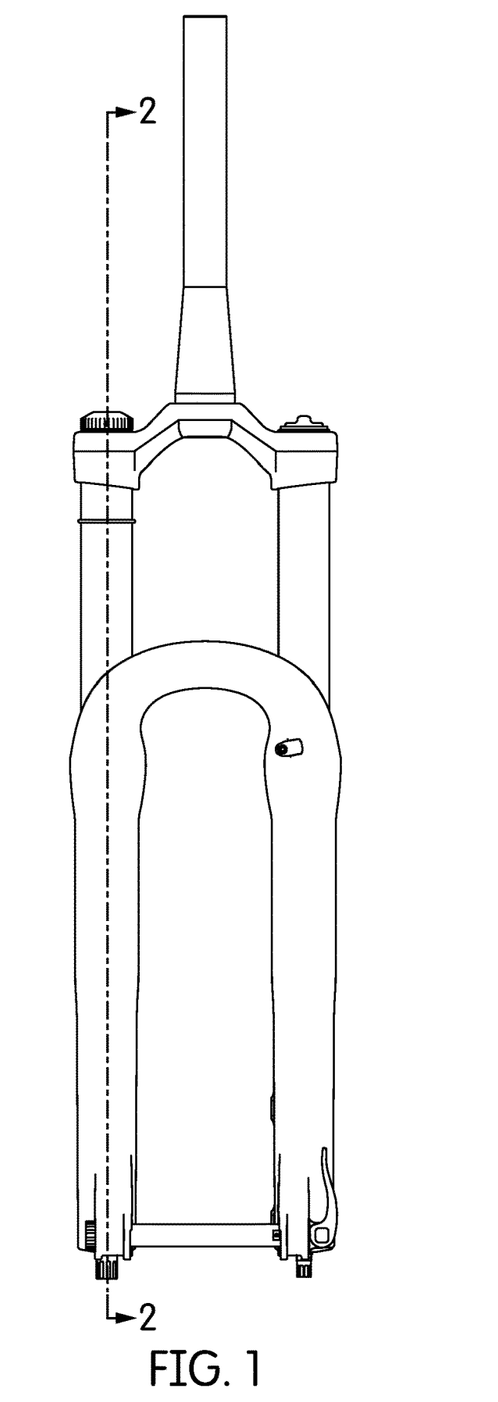
FIG. 1 is a side view of a front fork of a bicycle according to the present disclosure.
Figure 2:
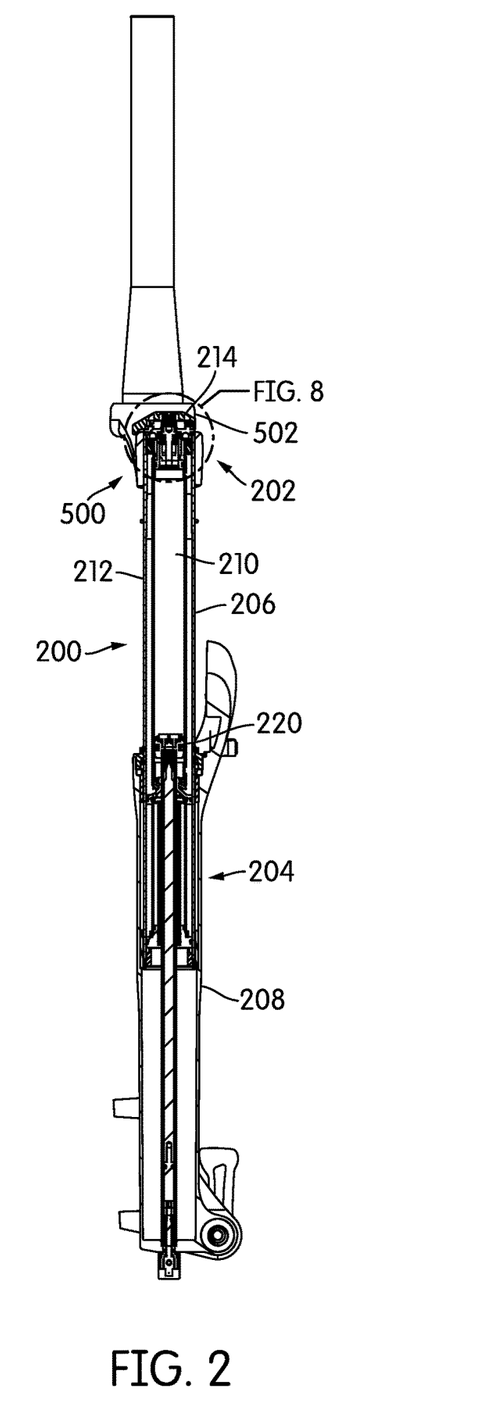
FIG. 2 is a cross-sectional view of one leg of the front fork of FIG. 1.

A traditional front fork is shown in FIGS. 1 and 2, FIG. 2 being a section of one leg of the fork. A damper may be conventionally incorporated into the area shown in dashed lines on FIG. 2.

Figure 3:
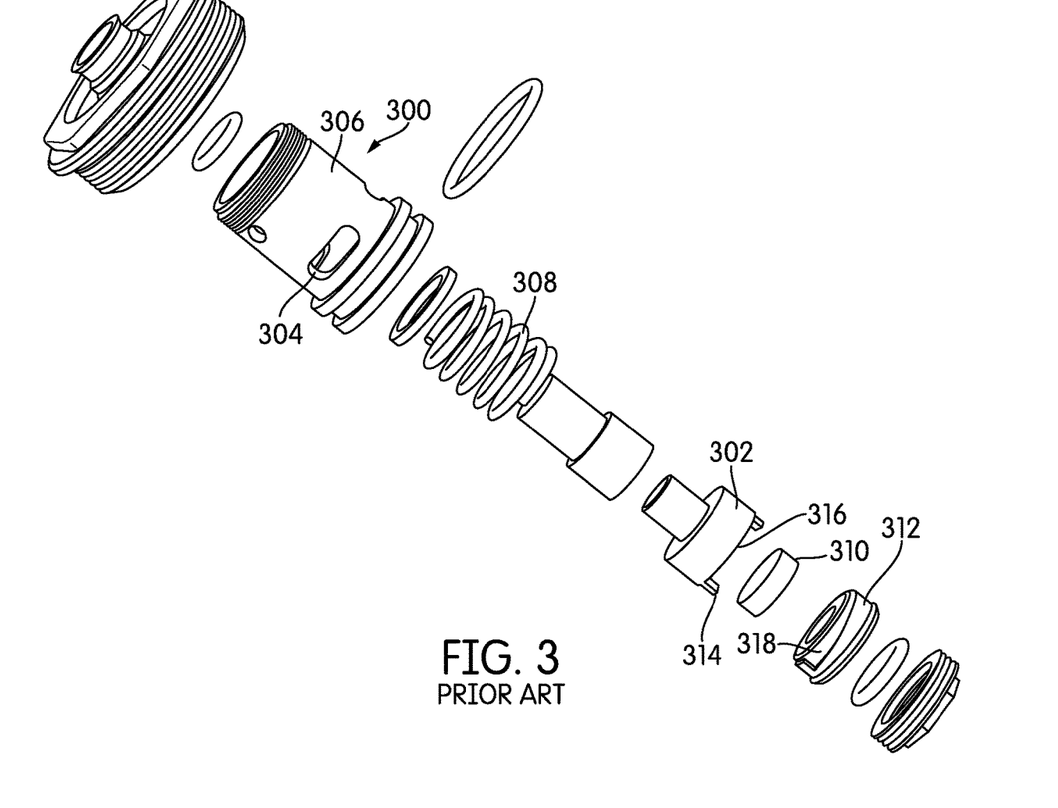
FIG. 3 is an exploded view of a prior art damper.
Figure 4:
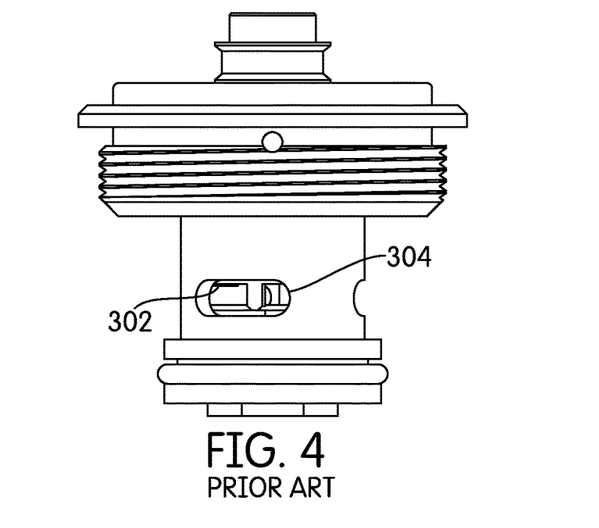
FIG. 4 is the prior art damper of FIG. 3 in assembled condition.

A damper currently in production by Mountain Racing Products is shown in FIGS. 3 and 4, FIG. 3 being an exploded view of FIG. 4. In this prior art embodiment of a damper 300, a blocker 302 is used to variably block apertures 304 in a housing 306. The blocker 302 is biased towards a ramped portion 312 using a spring 308 and a magnet 310. Teeth 314 project from a bottom end 316 of the blocker 302. When the blocker 302 is rotated by an external adjuster (not shown), each tooth 314 rides along a sloped guide 318 in the ramped portion 312. This rotational movement rotates the blocker 302 relative to the housing 306 and the apertures 304. In addition, the rotational movement also axially moves the blocker 302 relative to the housing 306. This axial position of the blocker 302 governs the amount of the apertures 304 that are exposed and through which fluid can flow without triggering the valve. FIG. 4 shows the blocker 302 in a high axial position, exposing almost all of each aperture 304. Upon application of a force on the bottom end 316 of the blocker 302 due to a compression stroke, the blocker 302 moves axially to most fully expose each aperture 304 and maximally allow fluid to flow through the apertures 304.

However, in such a design, the amount of force required to begin the opening of the valve will vary, depending on the rotational position of the blocker. This is because adjusting the rotational position of the blocker will also adjust the axial position of the blocker. This change in axial position will also change the preload on the spring and will move the magnet to reduce the magnetic closing force.

Accordingly, it may be desirable for a damper to allow for an adjustment of the valve to allow variable damping, while having a consistent force profile for fluid overcoming the bias and opening the valve to a completely open position and reclosing the valve. Further, it may be desirable for such a design to have a reduced turbulence and viscous drag to improve fluid flow through the aperture.

BRIEF SUMMARY OF THE INVENTION

In one embodiment, a damped bicycle suspension containing a substantially incompressible fluid includes a valve body, a blocker, a bias, and an adjuster. The valve body may define at least one aperture. The aperture may have a size and shape and may allow passage of the substantially incompressible fluid between a first chamber and a second chamber. The blocker may be configured to be capable of rotational movement about and axial movement along an axis of rotation. Each of the axial and rotational movement may be substantially independent of the other. The bias may be positioned against one end of the blocker and may axially urge the blocker toward a blocking position. The adjuster may be connected to the blocker and may be configured to rotationally move the blocker. The blocker may be rotationally positionable in a fully open position, where an opening defined in the blocker is maximally adjacent the at least one aperture. The blocker may be rotationally positioned in a fully closed position, where the opening defined in the blocker is maximally away from the at least one aperture.

The aperture may be an elongated slot. The opening defined in the blocker may be a relief on a free end of the blocker. The slot may have a substantially flat bottom. The blocker may move to an exposure position when a force applied to the blocker by the bias is exceeded by another force on the blocker. The adjuster may be capable of being rotated to move the blocker to variably occlude the aperture in the valve body. Flow of the substantially incompressible fluid between the first chamber and the second chamber may be substantially prevented when the blocker is positioned in the fully closed position and a force of the bias has not been exceeded.

In another embodiment, a damped bicycle suspension includes a valve body, a blocker, an adjuster, and a bias. The valve body may define at least one elongated aperture having a length and configured to allow a substantially incompressible fluid to flow between a first chamber and a second chamber. The blocker may define a continuous relief extending around only a portion of the circumference of the blocker. The adjuster may extend outside the valve body and may be capable of rotating the blocker, thereby varying the relative rotational positions of the relief and the at least one elongated aperture. The bias may be adjacent one end of the blocker and may apply a force to the blocker in an axial direction along an axis about which the blocker is rotatable. The blocker may be configured to be capable of displacement between a blocking position and an exposure position, where the exposure position allows fluid to flow through the length of the at least one elongated aperture. A magnitude of the force applied to the blocker in an axial direction by the bias may be independent of the rotational position of the blocker relative to the at least one elongated aperture.

The at least one elongated aperture may extend around about one half of the circumference of the valve body. The continuous relief may extend around about one half of the circumference of the blocker. The blocker may be configured to be capable of moving to the exposure position when another force on the blocker exceeds the force applied by the bias. The adjuster may be configured to rotate the blocker to a fully open position, where a maximum portion of the continuous relief is positioned adjacent the at least one elongated aperture, and to a fully closed position, where a minimum portion of the continuous relief is positioned adjacent the at least one elongated aperture. The adjuster may be capable of being rotated to move the blocker to variably occlude the at least one elongated aperture. The bias may be capable of resisting pressure from the substantially incompressible fluid in at least one of the chambers. Flow of the substantially incompressible fluid between the first chamber and the second chamber may be substantially prevented when the blocker is in the fully closed position and pressure from the substantially incompressible fluid is insufficient to overcome a force exerted by the bias.

In another embodiment, a damped suspension for a bicycle includes a valve body and a damping valve. The valve body may at least partially define a first chamber, a second chamber, and an aperture therebetween. The first chamber and the second chamber may each be capable of containing at least a portion of a substantially incompressible fluid. The aperture may be configured to allow the substantially incompressible fluid to flow between the first chamber and the second chamber. The damping valve may be intermediate the first chamber and the second chamber. The damping valve may include a blocker, an adjuster, and a bias. The blocker may be rotatably disposed in the valve body and may define a relief at least partially around a periphery of the blocker. The adjuster may be attached to the blocker and may extend outside the valve body. The adjuster may be capable of rotating the blocker to vary a rotational position of the relief and thereby to variably occlude the aperture. The bias may be configured to axially urge the blocker toward a blocking position along an axis of rotation of the blocker. Pressure from the substantially incompressible fluid in the first chamber may be capable of axially moving the blocker into an exposure position. A magnitude of a force applied by the bias may be substantially independent of the rotational position of the relief.

The aperture may be an elongated slot. The elongated slot may extend about halfway around the circumference of the valve body. The relief may extend about halfway around the circumference of the blocker. The bias may be configured to allow the blocker to move toward an exposure position upon a sharp force applied to the suspension.

In another embodiment, a suspension system of a vehicle may include a first chamber, a second chamber, and a valve. The valve may control flow of a substantially incompressible fluid between the first chamber and the second chamber.

The valve may include a valve body, a rotatable blocker, a bias, and a support. The valve body may define an aperture capable of permitting the substantially incompressible fluid to flow between the first chamber and the second chamber. The rotatable blocker may have an axis and a first end. A bias may be configured to exert a force on the blocker in a first direction along the axis. A support may be configured to contact the first end of the rotatable blocker when the bias positions the blocker in a blocking position. The support may be spaced from the aperture.

The rotatable blocker may be configured to be rotatable about its axis. The blocker may define an opening. The suspension system may also include an adjuster capable of rotating the opening relative to the aperture. The blocker may be configured to move within an interior cavity of the valve body.

The support may be positioned substantially symmetrically within the valve body. At least half the support may be positioned in the valve body in the half of the interior volume of the valve body remote from the aperture.

In another embodiment, a suspension system of a vehicle may include a first chamber, a second chamber, and a valve. The valve may control flow of a substantially incompressible fluid between the first chamber and the second chamber.

The valve may include a valve body, a rotatable blocker, an adjuster and a bias. The valve body may define an aperture capable of permitting the substantially incompressible fluid to flow between the first chamber and the second chamber. The rotatable blocker may have an axis and a first end having a surface area. The adjuster may adjustably rotate the rotatable blocker. The bias may be configured to exert a force on the blocker in a first direction along the axis.

During a stroke of a suspension system, force applied to the blocker by the substantially incompressible fluid in a second direction along the axis opposite the first direction may be capable of exceeding the force exerted by the bias on the blocker. This may thereby move the blocker from a position blocking the aperture to a position exposing the aperture. The surface area of the first end of the rotatable blocker exposed to the substantially incompressible fluid in the position blocking the aperture may be independent of the rotational position of the rotatable blocker.

The rotatable blocker may be configured to be rotatable about its axis. The blocker may define an opening. The suspension system may also include an adjuster capable of rotating the opening relative to the aperture. The blocker may move within an interior cavity of the valve body. The blocker may be substantially cylindrical.

The suspension system may further include a support spaced from the aperture within the valve body and against which the bias biases the blocker. The support may be positioned substantially symmetrically within the valve body. At least half the support may be positioned within the valve body in the half of the interior volume of the valve body remote from the aperture.

In another embodiment, a suspension system for a vehicle includes a first chamber, a second chamber, and a valve for controlling the flow of a substantially incompressible fluid between the first chamber and the second chamber. The valve may include a valve body, a blocker, and adjuster, and a bias.

The valve body may have a sidewall at least partially defining an aperture that defines a fluid flow path between the first chamber and the second chamber. The valve body may extend to a valve body opening. The blocker may be disposed in the valve body. The blocker may have a first end, a second end, and an axis about which the blocker is rotatable and along which the blocker is displaceable into a plurality of axial positions. The adjuster may be attached to the blocker and may be configured to adjustably rotate the blocker. The bias may be capable of exerting an axial force on the second end of the blocker in a first direction toward the first end of the blocker. The sidewall and the first end of the blocker may at least partially define a void within the sidewall adjacent a lower edge of the aperture and extending toward the valve body opening.

The suspension system may further include a support positioned within the valve body and spaced from the aperture. The support may partially define the void. An opening may be defined in the blocker. The adjuster may be capable of rotating the blocker to position the opening in a plurality of positions to thereby variably occlude the aperture. The opening may be a relief on one end of the blocker. The void may be defined in each of the plurality of axial positions.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object laterally farther from the vertical centerplane of the bicycle. In addition, the terms "bicycle" and "bike" are used herein interchangeably. A person having ordinary skill in the art will understand that if something is referred to as one, it can refer to the other.

One embodiment of a valve or damper for use in controlling the flow of fluid in a bicycle suspension is shown in FIGS. 5-9. As may be seen in FIG. 5, the damper 500 may include a head 502. As may be best seen in FIG. 2, the head 502 may be positioned at a top end 202 of one leg 204 of a bicycle suspension 200. In the configuration shown, the bicycle suspension 200 may be configured to use a substantially incompressible fluid. Most of the components in the suspension configuration 200 shown are conventional, and other embodiments of suspensions using substantially incompressible fluids could be substituted therefor. In the embodiment shown, the leg 204 includes an upper portion 206 and a lower portion 208 that telescopically interfit. A plunger 220 is attached to the lower portion 208 and is configured to slide within the upper portion 206. When the suspension 200 is in use, as is conventional, the bicycle may hit an obstacle or there may be additional impacts to the wheel to which the suspension is attached. When such an impact occurs, the upper portion 206 and lower portion 208 move toward one another, the plunger 220 moving upward relative to the upper portion 206. This movement of the plunger 220 will move the substantially incompressible fluid upward toward the damper 500, and when appropriate, through the damper 500, based on the configuration of the damper 500 as described in greater detail below.

Returning to FIG. 5, the head 502 may include threads 504 that allow the damper 500 to be attached within the leg 204. A valve body 506 may be secured to the head 502. The valve body 506 may include threads 508 that mate with threads 510 on the head 502. The valve body 506 may be annular and may define at least one aperture 512 therethrough. The aperture 512 may be configured to allow passage of the substantially incompressible fluid between a first chamber 210 and a second chamber 212 (best seen in FIG. 2), as will be described in greater detail below. In the embodiment shown in the FIGS., the first chamber 210 is a compression chamber and the second chamber 212 is a reservoir chamber. The valve body 506 may at least partially define the first chamber 210 and the second chamber 212. The valve body may have an axis 514 in its center, and along which other parts may be aligned.

Figure 5:
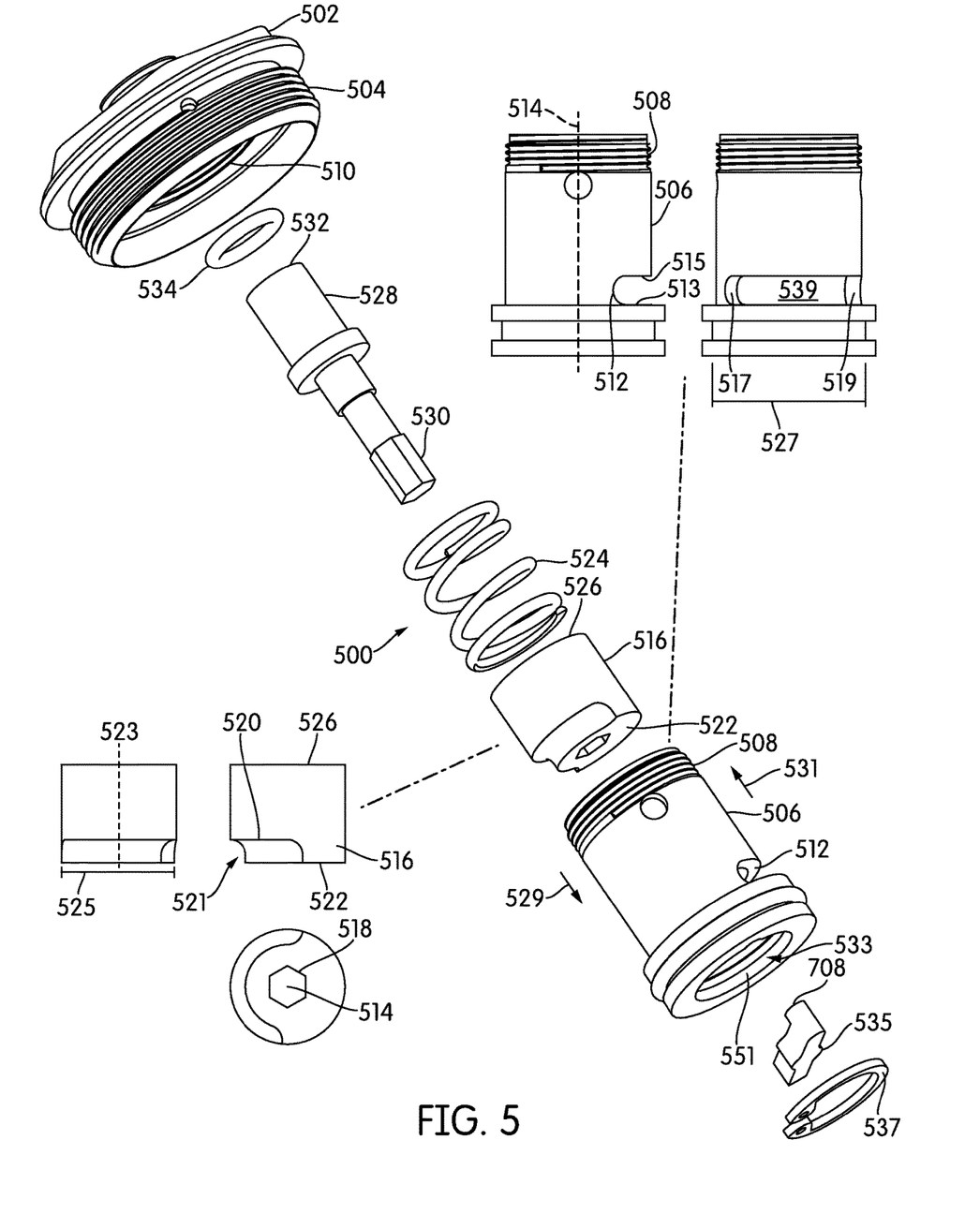
FIG. 5 is an exploded view of one embodiment of a damping valve according to the present disclosure.

The aperture 512 may desirably be an elongated slot, as shown, but may also take the form of a series of smaller apertures or any other desirable configuration. The aperture 512 may have a shape and size. In many embodiments, it may be desirable for the aperture 512 to have a substantially flat or planar lower surface 513 and a substantially flat or planar upper surface 515. As shown in the illustrated embodiment, the first end 517 and the second end 519 of the aperture 512 may be curved. A person having ordinary skill in the art is able to select an aperture of an appropriate shape and size to allow an appropriate volume of substantially incompressible fluid to flow therethrough.

The opening and closing of the aperture 512 may be governed by the position of a blocker 516. The blocker 516 may be disposed or positioned within the valve body 506.

The blocker 516 may have an axis 523 that is coaxial with the axis 514 of the valve body 506. It will be understood by a person having ordinary skill in the art that references to the axis 514 may also refer to the axis 523 and vice versa where, as in the embodiments illustrated herein, the axis 514 and the axis 523 are coaxial. The blocker 516 may be substantially cylindrical and may include a central aperture 518. In the embodiment shown, the central aperture 518 has a hex shape, but such a shape is subject to the selection of a designer. The blocker 516 may define a second opening that allows fluid to flow from the first fluid chamber 210 through the second opening and the aperture 512 and into the second fluid chamber 212. The second opening may substantially correspond in size and shape to the size and shape of the aperture 512. As shown in the illustrated embodiment, the second opening may be a relief 520. As shown in the illustrated embodiment, the relief 520 may be continuous. In other embodiments, the relief 520 may be a series of discontinuous reliefs. The relief 520 may define a passageway for fluid to flow through the aperture 512 in the valve body 506, as will be described in greater detail below. In many embodiments, for ease of manufacturing, the relief 520 may be formed on one side 522, which in the illustrated embodiment is a bottom side or free end, of the blocker 516. In some embodiments, the relief 520 may have a curved profile as shown generally at 521. In many embodiments, the relief 520 may be a continuous relief.

Figure 10:
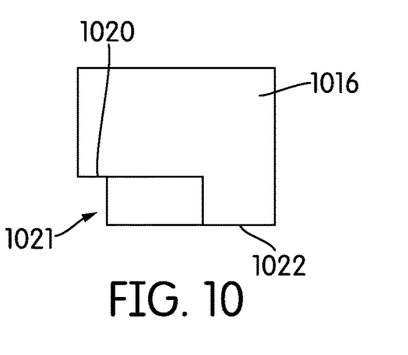
FIG. 10 is a side view of an alternative blocker design.
Figure 11:
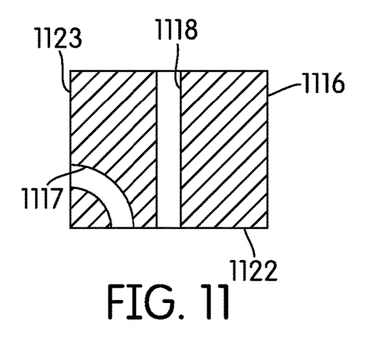
FIG. 11 is a cross-sectional view of another alternative blocker design.

Alternative embodiments of the blocker may be seen in FIGS. 10 and 11. Either the blocker 1016 or the blocker 1116 may be substituted for the blocker 516 with minor modifications to the remainder of the design, such as the bias 524, as will be apparent to a person having ordinary skill in the art.

In the blocker 1016 of FIG. 10, the second opening may be a relief 1020. The relief 1020 may define a passageway for fluid to flow through the aperture 512 in the valve body 506. In the embodiment shown in FIG. 10, the relief 1020 is formed on a bottom side 1022 of the blocker 1016. In FIG. 10, the relief has an angular configuration, shown most clearly at 1021.

In other embodiments, the second opening may be formed by a through hole through the blocker 1116, as shown by way of example in FIG. 11. The blocker 1116 is shown in cross-section. The blocker 1116 may include a central bore or aperture 1118 similar or identical to the central bore or aperture 518 as described above. In addition, the blocker 1116 may include a second bore or opening 1117 that extends from the bottom surface 1122 of the blocker to the side surface 1123 of the blocker 1116. The second bore 1117 may define a passageway to permit fluid to flow through the aperture 512 in the valve body 506. As shown in the embodiment illustrated, the second bore 1117 may be curved, but may take another shape for any desirable reason.

A person having ordinary skill in the art is able to select from among the designs shown or other appropriate designs to achieve the results the designer wishes to achieve. The embodiments illustrated are merely examples of appropriate designs.

Returning to FIG. 5, a bias 524, such as the coil spring shown, may be positioned against a second side 526 of the blocker 516 and may axially urge or bias the blocker 516 along the axis 514 in a first direction 529. An adjuster stem 528 may pass through the bias 524 along the axis 514 and into the central cavity 518 of the blocker 516. As may be seen, the lower end 530 of the adjuster stem 528 may have a shape that corresponds with the shape of the central aperture 518 of the blocker 516. In the illustrated embodiment, that shape is a hex shape. The upper end 532 of the adjuster stem 528 may protrude upward through the head 502. In many embodiments, it may be desirable to use an o-ring seal 534 to minimize any gap between the adjuster stem 528 and the head 502, in order to prevent contaminants from entering the suspension system. As may be best seen in FIG. 2, the free end 532 of the adjuster stem 528 may be attached to an adjuster 214. The adjuster 214 may be configured to be manipulable by a user to rotate the blocker 516 about the axis 514.

As may be apparent to a person having skill in the art, the blocker 516 may be configured to fit within and displace or reciprocate within an inner cavity 533 of the valve body 506. Accordingly, the blocker 516 may be displaceable or positionable into a plurality of axial positions, as will be discussed in greater detail below. The outer diameter 525 of the blocker 516 may be smaller than the internal diameter 527 of the valve body 506. In many embodiments, it may be desirable for the outer diameter 525 and the internal diameter 527 to be relatively close in size to minimize leakage of any substantially incompressible fluid between the blocker 516 and the valve body 506.

Figure 7:
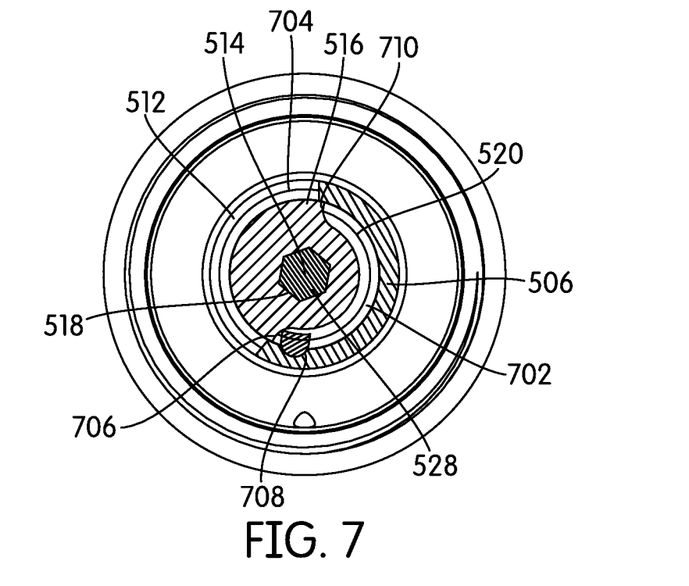
FIG. 7 is a bottom view of the damper shown in FIG. 6.

As may be best seen in FIG. 7, the relative size and shape of the aperture 512 and the relief 520 may be seen. FIG. 7 is a cross sectional view of the damper 500 in assembled condition. As may be seen, the adjuster stem 528 may be inserted along the axis 514 through the central aperture 518 in the blocker 516. The blocker 516 may be inserted within the valve body 506. The relief 520 may have a length 702. The length 702 of the relief may extend about one half of the circumference of the blocker 516. The aperture 512 may be elongated and have a length 704. The length 704 of the aperture 512 may extend about one half of the circumference of the valve body 506.

The blocker 516 may be configured to rotate about the axis 523, based on the rotation of the adjuster 214. When the adjuster 214 is rotated, it may rotate the adjuster stem 528. The rotation of the adjuster stem 528 may rotate the blocker 516 about the axis 523 and substantially along a plane substantially perpendicular to the axis 523. This may be seen most clearly in FIG. 6. A plane 600 substantially perpendicular to the axis 514 is shown. The blocker 520 may be configured to rotate substantially along this plane 600, such that the blocker 520 is not axially displaced when it is rotated by the adjuster 214.

Looking back to FIG. 7, rotation of the adjuster 214 may adjust the relative position of the relief 520 and the aperture 512, such that the blocker 516 variably occludes the aperture 512. The position shown in FIG. 7 may be considered a fully closed or maximally closed position. In such a position, the relief 520 and the aperture 512 do not overlap one another, or the relief 520 may be considered to be positioned maximally away from the aperture 512. One edge 706 of the relief 520 is shown as abutting an optional stop 708 to appropriately position the relief 520 in its fully closed position. In some embodiments, as the one shown in FIG. 7, the stop 708 may be a finger or other projection extending from a support 535, as may be best seen in FIG. 5 and which will be described in greater detail below. When the blocker 516 is rotated clockwise from the fully closed position, a progressively or variably greater portion of the relief 520 may be positioned adjacent the aperture 512. The rotation may continue until the relief 520 is maximally adjacent the aperture 512 and the other edge 710 of the relief 520 contacts the other side of the stop 708. Such a position may be considered a fully open or maximally open position. The adjuster 214 may be configured to allow infinite adjustment to any position between the fully open and the fully closed position.

In the embodiment shown, the stop 708 is shown to be of a shape and size to allow the blocker 516 to be rotated so that the relief 520 may be positioned completely away from the aperture 512. In other embodiments, a designer may deem it appropriate for the most closed position to be positioned to have a small overlap between the relief 520 and the aperture 512. In addition, in the embodiment shown, the stop 708 is positioned to allow the relief 520 and the aperture 512 to be positioned substantially completely adjacent one another in a fully open position. In other embodiments, the relief 520, aperture 512, and/or the stop 708 may be configured to restrict the overlap of the relief 520 and the aperture 512. In such configurations, the position of the blocker 516 where the relief 520 and aperture 512 have the least overlap may be considered the "fully closed" position. The position of the blocker 516 where the relief 520 and the aperture 512 have the greatest overlap may be considered the "fully open" position.

Figure 8:
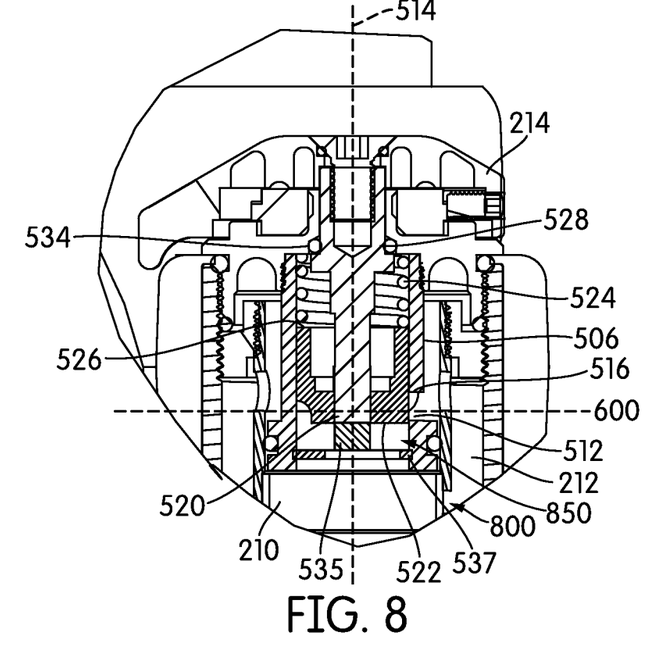
FIG. 8 is a sectional view of the damper of FIG. 5 with the blocker in the blocking position assembled in the suspension.
Figure 9:
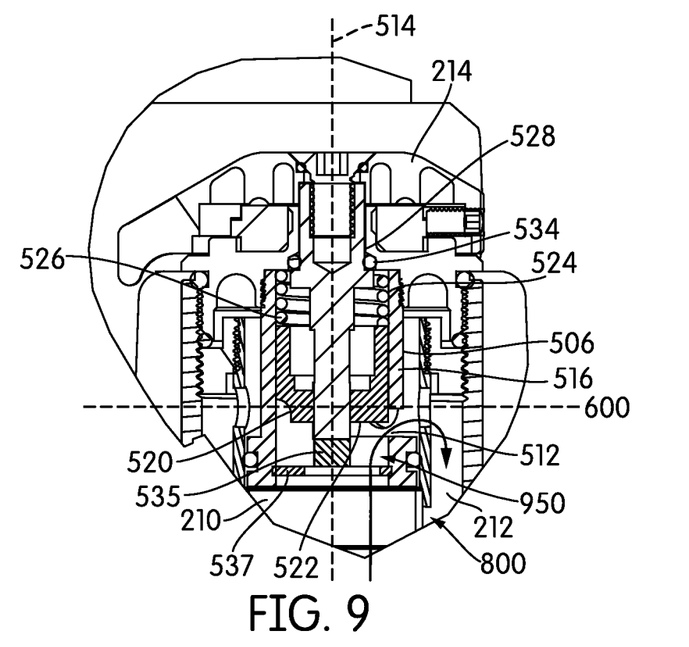
FIG. 9 is a sectional view of the damper of FIG. 5 with the blocker in the exposure position assembled in the suspension.

Turning now to FIGS. 8 and 9, in addition to the rotational freedom of the blocker 516 about the axis 523 and along the plane 600, the valve 500 is also configured to allow movement, displacement, and/or reciprocation of the blocker 516 along the axis 514 between a blocking position as shown in FIG. 8 and an exposure position as shown in FIG. 9. In a rest configuration, the bias 524 may exert a force or preload against a top side 526 of the blocker 516. This force or preload may urge the blocker 516 towards the blocking position. When the bicycle encounters an impact, a compression stroke may start, where the plunger 220 may move upwardly with respect to the upper portion 206 (see FIG. 2). This movement may displace any substantially incompressible fluid present within the first fluid chamber 210. As the substantially incompressible fluid moves upwardly in response to pressure from the plunger 220, the substantially incompressible fluid may impinge upon the first end 522 of the blocker 516, which may be a lower surface or free end. If the blocker 516 is rotated such that the opening 520 is either partially or maximally open, the substantially incompressible fluid may flow through the opening 520 and the aperture 512 and into the second fluid chamber 212 without further effect on the blocker 516. However, if the force of the impact is great enough, the magnitude of the force exerted by the fluid on the lower surface 522 of the blocker 516 in a second direction 531 may be great enough to exceed the magnitude of the force exerted by the bias 524 on the second end 526 of the blocker 516, which may be an upper surface. When the force of the bias 524 in the first direction 529 is exceeded by the force of the substantially incompressible fluid in the opposite, second direction 531, the blocker 516 may move or be displaced upwardly to an exposure position and expose the aperture 512 directly to the first fluid chamber 210. When the blocker 516 moves upwardly, the full length 704 of the aperture 512 may be exposed, regardless of the rotational position of the blocker 516. Even if the blocker 516 does not move upward to the extent fully available, when the blocker 516 moves upwardly and the full length 704 of the aperture 512 is exposed at any height, such a position can be said to expose the full length 704 of the aperture 512 and the blocker 516 may be said to be in the exposure position.

After the compression stroke has ended and the rebound stroke has begun, fluid may return to the first fluid chamber 210 from the second fluid chamber 212 through the aperture 512 if the blocker 516 is rotated to at least a partially open position. Fluid may also return to the first fluid chamber through another conventional structure, such as the port 800. When the upward pressure from the fluid is removed, the bias 524 may again move the blocker 516 downwardly to the blocking position.

Figure 6:
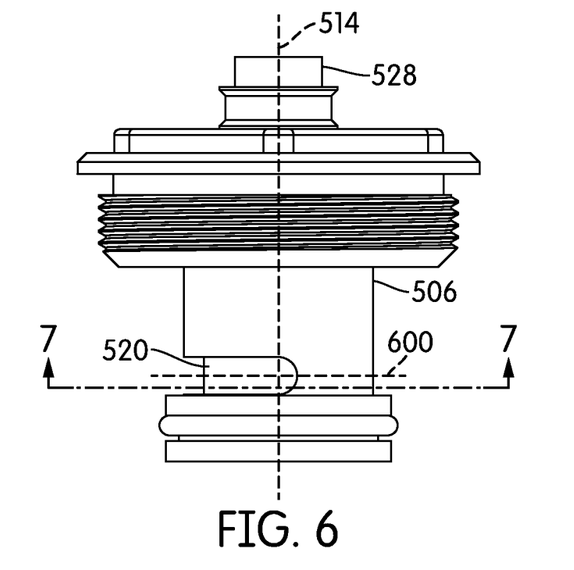
FIG. 6 is a side view of the damper of FIG. 5 in assembled condition.

In many embodiments, it may be desirable for the flow of substantially incompressible fluid between the first chamber 210 and the second chamber 212 to be substantially prevented when the blocker 516 is in the fully closed position and the blocking position, where any other force applied to the blocker 516 is insufficient to overcome or exceed the force of the bias 524 against the blocker 516. It may also be desirable for the force of the bias 524 against the top surface 526 of the blocker 516 to be independent of the rotational position of the blocker 516. In the embodiments shown, the rotation of the blocker 516 may be about the axis 514 and substantially along a plane 600 substantially perpendicular to the axis 514 of the valve body 506. Because of this configuration, the force applied by the bias 524 on the blocker 516 biasing the blocker 516 into the blocking position is likely to remain substantially constant for all rotational positions, and is therefore substantially independent of the rotational position of the blocker 516 and the relief 521. A person having ordinary skill in the art may select an appropriate bias that allows the blocker 516 to remain in the blocking position in all desirable circumstances, but that allows the blocker 516 to move to an exposure position when a sharp force is encountered by the suspension. Further, the force exerted by the fluid on the lower surface 522 of the blocker 516 in a second direction 531 is also independent of the rotational position of the blocker 516. This is because the entire surface area of the lower surface 522 of the blocker 516 may be exposed within the valve body 506 when the blocker 516 is in the position blocking the aperture 512, rather than resting on another structure, as may be common in prior art embodiments.

In some embodiments, the amount of viscous drag may be reduced by selecting an appropriate configuration of the valve. As may be best seen in the exploded view of FIG. 5, a support 535 may be inserted into the valve body 506. In some embodiments, the support 535 may ride in a groove or slot (not shown) to minimize the movement of the support 535 either rotationally or along the axis of rotation 514. A retainer, such as the snap ring 537 or other suitable structure, may be positioned within or adjacent the valve body 506 to hold the support 535 within the valve body. As may be best seen in FIGS. 8 and 9, when the blocker 516 is in the blocking position (FIG. 8), the bias 526 may tend to force the blocker 516 against the support 535. The support 535 may thereby retain the blocker 516 in an appropriate axial position to allow the opening of the aperture 512 upon the application of a desired force of fluid against the free end 522 of the blocker 516. In many embodiments, it may be desirable for the support 535 to be spaced from or otherwise remote from the aperture 512. When the support 535 is spaced from the aperture 512, viscous drag may be reduced, because there is no structure substantially parallel to the free end 522 of the blocker 516 adjacent the aperture 512. Instead, fluid is able to flow substantially directly along the interior surface 539 of the valve body 506 and through the aperture 512. A void 850, as may be best seen in FIG. 8, may be at least partially defined adjacent the aperture 512 and within the sidewall or interior surface 539 of the valve body. The void 850 may be at least partially defined by the sidewall 539, one end 522 of the blocker 516, and the support 535. The void may desirably extend away from the lower edge 513 of the aperture towards the valve body opening 551. The void 850 may be defined in each axial position taken by the blocker 516, as may be observed in a comparison of FIGS. 8 and 9. In FIG. 8, where the blocker 516 is in the blocking axial position, the void 850 is smaller than the void 950 in FIG. 9, where the blocker 516 is in the exposure axial position. In both exemplary FIGS., the void 850, 950 may extend adjacent or along the sidewall 539 between an area adjacent the lower edge 513 towards the valve body opening 551. However, as shown in FIG. 9, the void may also extend between the area adjacent the lower edge 513 toward the upper edge 515 as well. In many embodiments, the retainer 537 may be spaced from or positioned remote from the aperture 512 in order to minimize or eliminate any viscous drag from an interfering parallel surface. The size of the retainer 537 may also be adjusted to minimize its size adjacent the aperture 512, while allowing a greater size opposite the aperture 512. In many embodiments, the support 535 may be substantially symmetrically shaped, sized, and positioned within the valve body 506. The use of such a configuration may minimize friction between the blocker 516 and the valve body 506. If friction is less of a concern, the support 535 may be positioned within the interior volume of the valve body 506 in the half of the body that is spaced away from the aperture 512. Such a configuration could include a c-shaped design or other shapes that may be contemplated by a person having ordinary skill in the art. In many embodiments, such as the one shown, the support 535 may be positioned substantially symmetrically about a plane bisecting the valve body 506. One half of the support 535 may be positioned in the half of the internal volume of the valve body 506 that is spaced away from the aperture 512. An appropriate size, shape, and placement of the support 535 may be selected by a person having ordinary skill in the art to allow the support 535 to be spaced from the aperture 512, thereby minimizing or eliminating viscous drag, while still providing an appropriate stop function relative to the blocker 516 and bias 524. As was noted above, in some embodiments, the support 535 may further include a finger or projection, one example of which is identified with the number 708, that functions as a stop to restrict rotational movement of the blocker 506 in one or both directions. The precise position and configuration of the projection 708 may be selected by a person having ordinary skill in the art depending on the configuration of the blocker 506, the support 535, and the remainder of the valve.

Figure 12:
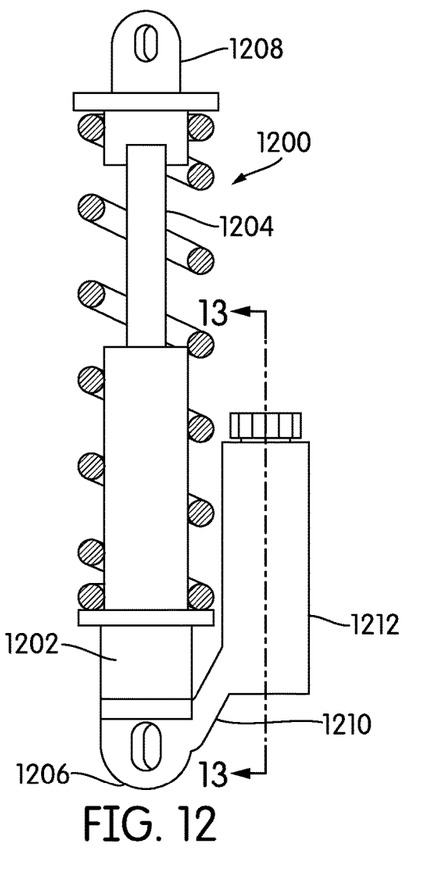
FIG. 12 is a side view of a rear suspension of a bicycle in accordance with the present disclosure.
Figure 13:
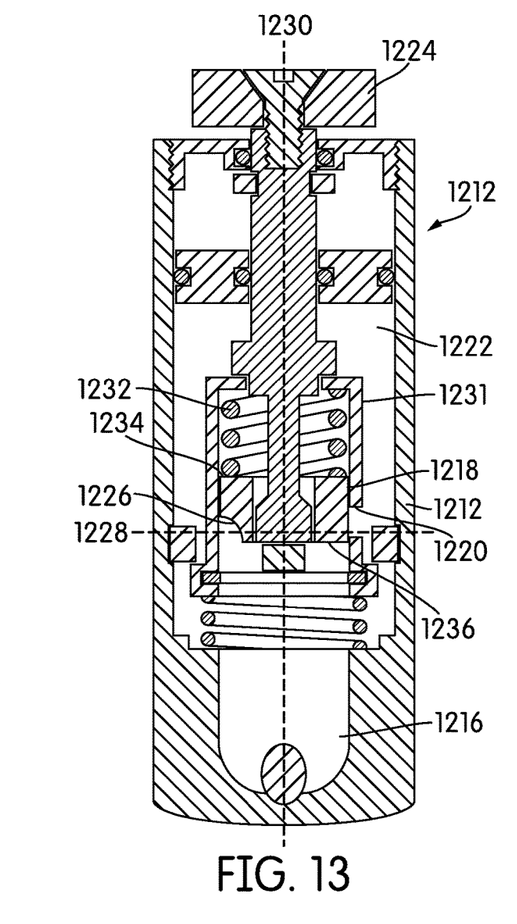
FIG. 13 is a sectional view of the reservoir chamber of the rear suspension of FIG. 12.

Another embodiment of the damped suspension is shown in FIGS. 12 and 13. The embodiment of FIGS. 12 and 13 is of a rear suspension system, rather than the front suspension system of FIGS. 1, 2, and 5-11. Most of the suspension system 1200 is conventional and is not shown in detail. The suspension system 1200 may include a closed annular chamber 1202. A suspension arm 1204 may include a plunger that interfits with the chamber 1202, the details of which are conventional and are not shown. A first end 1206 of the suspension 1200 may be attached directly or indirectly to a bicycle frame in a known manner and a second end 1208 of the suspension 1200 may be attached directly or indirectly to the wheel in a known manner. When the wheel encounters an obstacle, it may move the second end 1208 toward the first end 1206, thereby moving the plunger upward in the chamber 1202. This movement may displace a substantially incompressible fluid therein and force it through a passageway to an auxiliary or reservoir chamber 1212. A damping mechanism 1214 may be incorporated into the auxiliary chamber 1212.

As will be apparent to a person having ordinary skill in the art, the structures in the rear damping mechanism 1214 are substantially identical to those described in connection with the front damping mechanism 500, and accordingly, the details of that construction and function will not be repeated here. The differences between the front damping mechanism 500 and the rear damping mechanism 1214 relate solely to the space and size limitations of a rear suspension 1200 versus a front suspension 200. In a front suspension 200, the damper 500 may be incorporated in-line with the remainder of the front suspension 200. In a rear suspension 1200, space limitations render such a design inappropriate. However, by incorporating an auxiliary chamber 1212, the substantially incompressible fluid may flow, upon compression, into the first chamber 1216. Depending on the position of the blocker 1218 relative to the aperture 1220 and the force of the substantially incompressible fluid displaced, the fluid may flow through the aperture 1220 into the second chamber 1222. As was true in the earlier embodiment, a user may manipulate the adjuster 1224 to rotate the blocker 1218 and the passageway or relief 1226 about the rotational axis 1230 and substantially along a plane 1228 substantially perpendicular to the axis 1230 of the valve body 1231, thereby variably occluding the aperture 1220. The blocker 1218 may be infinitely adjustable between a fully closed position (shown) and a fully open position. Because the blocker 1218 is configured to rotate along the plane 1228, the force of the bias 1232 against a first side 1234 of the blocker 1218 may be substantially independent of the rotational position of the blocker 1218. Accordingly, the reciprocation of the blocker 1218 between a blocking position (shown) and an exposure position may be governed almost entirely by the relative force of the substantially incompressible fluid against a second side 1236 of the blocker 1218 versus the force applied by the bias 1232 against the first side 1234 of the blocker 1218. As was true in the embodiment described above and shown in FIGS. 1-2 and 5-11, it may be desirable in some embodiments for fluid flow from the first chamber 1216 to the second chamber 1222 to be substantially prevented when the blocker 1218 is in its fully closed position and the force of the substantially incompressible fluid against the second side 1236 of the blocker 1218 is insufficient to overcome the force applied by the bias 1232 against the first side 1234 of the blocker 1218, i.e., when the blocker is in the fully closed and blocking position.

A person having ordinary skill in the art may select appropriate sizes, shapes, and qualities of the various parts of the suspension system 1200. However, it may be desirable to configure the damping valve 1214 such that the blocker 1218 moves to an exposure position upon the application of a sharp force to the wheel and to the lower end 1208 of the suspension system 1200.

While certain preferred embodiments of the present invention have been disclosed in detail, it is to be understood that various modifications may be adopted without departing from the spirit of the invention or scope of the following claims.

The invention claimed is:

1. A damped bicycle suspension containing a substantially incompressible fluid, comprising:
    (a) a valve body defining at least one aperture having a shape and size and allowing passage of the substantially incompressible fluid between a first chamber and a second chamber;
    (b) a blocker configured to be capable of rotational movement about, and axial movement along, an axis of rotation, wherein each of the axial and rotational movements is substantially independent of one another;
(c) at least one bias positioned against one end of the blocker and axially urging the blocker to a blocking position where the blocker blocks passage of the substantially incompressible fluid between the chambers, wherein the at least one bias is prestressed to press the free end of the blocker directly against the substantially fixed support without any other forces interacting with the blocker;
(d) an adjuster connected to the blocker and configured to rotationally move the blocker; and
(e) a substantially fixed support configured to contact a free end of the rotatable blocker when the at least one bias positions the blocker in a blocking position, wherein the support is spaced from the aperture and any bias;
wherein the blocker is rotationally positionable in a fully open position, where an opening defined in the blocker is maximally adjacent the at least one aperture;
wherein the blocker is rotationally positionable in a fully closed position, where the opening defined in the blocker is maximally away from the at least one aperture; and
wherein the opening defined in the blocker is positioned adjacent the substantially fixed support when the blocker is in the blocking position.

2. The damped bicycle suspension according to claim 1, wherein the aperture is an elongated slot.

3. The damped bicycle suspension according to claim 1, wherein the opening defined in the blocker comprises a relief on the free end of the blocker.

4. The damped bicycle suspension according to claim 2, wherein the slot has a substantially flat bottom.

5. The damped bicycle suspension according to claim 1, wherein when a force applied to the blocker by the at least one bias is exceeded by another force on the blocker, the blocker moves to an exposure position.

6. The damped bicycle suspension according to claim 1, wherein the adjuster is capable of being rotated to move the blocker to variably occlude the aperture in the valve body.

7. The damped bicycle suspension according to claim 4, wherein flow of the substantially incompressible fluid between the first chamber and the second chamber is substantially prevented when the blocker is positioned in the fully closed position and a force of the at least one bias has not been exceeded.

8. A damped bicycle suspension, comprising:
(a) a valve body defining at least one aperture having a shape and size and allowing passage of a substantially incompressible fluid between a first chamber and a second chamber during a compression stroke;
(b) a blocker configured to be capable of rotational movement about, and axial movement along, an axis of rotation, wherein each of the axial and rotational movements is substantially independent of the other;
(c) at least one bias positioned against a first end of the blocker, wherein every bias biasing the blocker exerts a force opposite the flow of the substantially incompressible fluid between the first chamber and the second chamber during the compression stroke;
(d) a substantially fixed support configured to contact a free end of the blocker, wherein the support is spaced from the aperture and every bias biasing the blocker; and
(e) an aperture defined in the blocker, wherein the aperture is adjacent the substantially fixed support when the free end of the blocker contacts the substantially fixed support;
wherein the at least one bias is configured to press the free end of the blocker directly against the substantially fixed support; and
wherein the at least one bias is prestressed to press the free end of the blocker directly against the substantially fixed support without any other forces interacting with the blocker.

9. The damped bicycle suspension according to claim 8, wherein the blocker is rotationally positionable in a fully open position and a fully closed position.

10. The damped bicycle suspension according to claim 8, wherein the aperture is an elongated slot.

11. The damped bicycle suspension according to claim 8, wherein the at least one bias is a single bias.

12. The damped bicycle suspension according to claim 8, wherein every bias biasing the blocker contacts the first end of the blocker.

13. A damped bicycle suspension, comprising:
(a) a valve body defining at least one aperture having a shape and size and allowing passage of a substantially incompressible fluid between a first chamber and a second chamber during a compression stroke;
(b) a blocker configured to be capable of rotational movement about, and axial movement along, an axis of rotation, wherein each of the axial and rotational movements is substantially independent of the other;
(c) at least one bias positioned against a first end of the blocker, wherein every bias biasing the blocker exerts a force opposite the flow of the substantially incompressible fluid between the first chamber and the second chamber during the compression stroke;
(d) a substantially fixed support configured to contact a free end of the blocker, wherein the support is spaced from the aperture and every bias biasing the blocker; and
(e) an aperture defined in the blocker, wherein the aperture is adjacent the substantially fixed support when the free end of the blocker contacts the substantially fixed support;
wherein the at least one bias is a single bias.

14. A damped bicycle suspension, comprising:
(a) a valve body defining at least one aperture having a shape and size and allowing passage of a substantially incompressible fluid between a first chamber and a second chamber during a compression stroke;
(b) a blocker configured to be capable of rotational movement about, and axial movement along, an axis of rotation, wherein each of the axial and rotational movements is substantially independent of the other;
(c) at least one bias positioned against a first end of the blocker, wherein every bias biasing the blocker exerts a force opposite the flow of the substantially incompressible fluid between the first chamber and the second chamber during the compression stroke;
(d) a substantially fixed support configured to contact a free end of the blocker, wherein the support is spaced from the aperture and every bias biasing the blocker; and
(e) an aperture defined in the blocker, wherein the aperture is adjacent the substantially fixed support when the free end of the blocker contacts the substantially fixed support;

wherein every bias biasing the blocker contacts the first end of the blocker.

15. The damped bicycle suspension according to claim 14, wherein the bias is configured to press the free end of the blocker directly against the substantially fixed support.

16. The damped bicycle suspension according to claim 15, wherein the at least one bias is prestressed to press the free end of the blocker directly against the substantially fixed support without any other forces interacting with the blocker.

17. The damped bicycle suspension according to claim 15, wherein the substantially fixed support is positioned substantially symmetrically within the valve body.

18. A damped suspension for a bicycle, comprising:
    (a) a valve body at least partially defining a first chamber, a second chamber, and an aperture therebetween, the first chamber and the second chamber each being capable of containing at least a portion of a substantially incompressible fluid, and the aperture is configured to allow the substantially incompressible fluid to flow between the first chamber and the second chamber; and
    (b) a damping valve intermediate the first chamber and the second chamber, comprising:
        (1) a blocker rotatably disposed in the valve body and defining a relief at least partially around a periphery of the blocker;
        (2) an adjuster attached to the blocker and extending outside the valve body and capable of rotating the blocker to vary a rotational position of the relief and thereby to variably occlude the aperture;
        (3) at least one bias configured to axially urge the blocker along an axis of rotation of the blocker to a blocking position where the blocker blocks passage of the substantially incompressible fluid between the chambers, wherein pressure from the substantially incompressible fluid in the first chamber is capable of axially moving the blocker into an exposure position, wherein a magnitude of a force applied by the at least one bias is substantially independent of the rotational position of the relief; and
        (4) a substantially fixed support configured to contact a free end of the blocker when the at least one bias positions the blocker in a blocking position, wherein the support is spaced from the aperture and any bias, wherein the relief is positioned adjacent the substantially fixed support when the free end of the blocker contacts the substantially fixed support;
    wherein every bias biasing the blocker contacts a first end of the blocker opposite the free end.

19. The damped suspension according to claim 18, wherein the aperture is an elongated slot.

20. The damped suspension according to claim 18, wherein the at least one bias is configured to allow the blocker to move toward an exposure position upon a sharp force applied to the suspension.

21. The damped suspension according to claim 19, wherein the elongated slot extends about halfway around the circumference of the valve body.

22. The damped suspension according to claim 21, wherein the relief extends about halfway around the circumference of the blocker.

23. A suspension system of a vehicle, comprising:
    (a) a first chamber;
    (b) a second chamber; and
    (c) a valve for controlling flow of a substantially incompressible fluid between the first chamber and the second chamber, comprising:
        (1) a valve body defining an aperture capable of permitting the substantially incompressible fluid to flow between the first chamber and the second chamber;
        (2) a rotatable blocker having an axis, a first end and a free end and defining an opening;
        (3) at least one bias configured to exert a force on the blocker in a first direction along the axis, wherein every bias biasing the blocker contacts the first end of the blocker; and
        (4) a substantially fixed support configured to contact the free end of the rotatable blocker when the at least one bias positions the blocker in a blocking position, wherein the support is spaced from the aperture and any bias, and where the opening is adjacent the substantially fixed support when the blocker is in the blocking position.

24. The suspension system according to claim 23, wherein the rotatable blocker is configured to be rotatable about its axis.

25. The suspension system according to claim 23, wherein the blocker is configured to move within an interior cavity of the valve body.

26. The suspension system according to claim 23, wherein the support is positioned substantially symmetrically within the valve body.

27. The suspension system according to claim 23, wherein at least half the support is positioned within the valve body in the half of an interior volume of the valve body remote from the aperture.

28. The suspension system according to claim 24, wherein the blocker defines an opening.

29. The suspension system according to claim 28, further comprising an adjuster capable of rotating the opening relative to the aperture.

30. A suspension system of a vehicle, comprising:
    (a) a first chamber;
    (b) a second chamber; and
    (c) a valve for controlling flow of a substantially incompressible fluid between the first chamber and the second chamber, comprising:
        (1) a valve body defining an aperture capable of permitting the substantially incompressible fluid to flow between the first chamber and the second chamber;
        (2) a rotatable blocker having an axis and a first end having a surface area;
        (3) an adjuster for adjustably rotating the rotatable blocker;
        (4) at least one bias configured to exert a force on the blocker in a first direction along the axis; and
        (5) a substantially fixed support configured to contact a free end of the rotatable blocker, wherein the support is spaced from the aperture and any bias in the system, wherein the at least one bias is prestressed to press the free end of the rotatable blocker directly against the support without any other forces interacting with the rotatable blocker;
        wherein, during a compression stroke of a suspension system, force applied to the blocker exclusively by the substantially incompressible fluid in a second direction along the axis opposite the first direction is capable of exceeding the force exerted by all biases on the blocker, thereby moving the blocker from a position blocking the aperture to a position exposing the aperture;

wherein the surface area of the first end of the rotatable blocker exposed to the substantially incompressible fluid in the position blocking the aperture is independent of the rotational position of the rotatable blocker; and wherein the rotatable blocker defines an opening and the opening is positioned adjacent the substantially fixed support when the blocker is in the position blocking the aperture.

31. The suspension system according to claim 30, wherein the rotatable blocker is configured to be rotatable about its axis.

32. The suspension system according to claim 30, wherein the blocker moves within an interior cavity of the valve body.

33. The suspension system according to claim 31, wherein the blocker defines an opening.

34. The suspension system according to claim 30, wherein the support is positioned substantially symmetrically within the valve body.

35. The suspension system according to claim 34, wherein at least half the support is positioned within the valve body in the half of an interior volume of the valve body remote from the aperture.

36. The suspension system according to claim 30, wherein the blocker is cylindrical.

37. The suspension system according to claim 33, wherein the adjuster is capable of rotating the opening relative to the aperture.

38. A suspension system of a vehicle comprising:
(a) a first chamber;
(b) a second chamber; and
(c) a valve for controlling flow of a substantially incompressible fluid between the first chamber and the second chamber, the valve comprising:
(1) a valve body having a sidewall at least partially defining an aperture that defines a fluid flow path between the first chamber and the second chamber, the valve body extending to a valve body opening;
(2) a blocker disposed in the valve body and having a first end, a second end, and an axis about which the blocker is rotatable and along which the blocker is displaceable into a plurality of axial positions;
(3) an adjuster attached to the blocker and configured to adjustably rotate the blocker;
(4) at least one bias capable of exerting an axial force on the second end of the blocker in a first direction toward the first end of the blocker; and
(5) a substantially fixed support configured to contact the first end of the rotatable blocker when the at least one bias positions the blocker in a blocking position, wherein the support is spaced from the aperture and any bias;
wherein the sidewall and the first end of the blocker at least partially define a void within the sidewall adjacent a lower edge of the aperture and extending towards the valve body opening;
wherein the at least one bias may be overcome only by a fluid pressure and wherein the at least one bias is prestressed to press the first end of the blocker directly against the support without any other forces interacting with the blocker; and
wherein the void is adjacent the substantially fixed support when the blocker is in the blocking position.

39. The suspension system according to claim 38, wherein the support partially defines the void.

40. The suspension system according to claim 38, further comprising an opening defined in the blocker, the adjuster capable of rotating the blocker to position the opening in a plurality of positions to thereby variably occlude the aperture.

41. The suspension system according to claim 40, wherein the opening is a relief on one end of the blocker.

42. The suspension system according to claim 38, wherein the void is defined in each of the plurality of axial positions.

* * * * *